Aug. 4, 1953　　　A. W. BOWYER ET AL　　　2,647,689
DECIMAL TO BINARY CONVERSION MACHINE
Filed Nov. 29, 1950　　　　　　　　　　　9 Sheets-Sheet 1

FIG. I.

Inventors
ALDRED W. BOWYER  JOHN R. CARTWRIGHT
By
　　　　　　　　　
Attorney.

Inventors
ALDRED W. BOWYER, JOHN R. CARTWRIGHT
By
Attorney.

Aug. 4, 1953     A. W. BOWYER ET AL     2,647,689
DECIMAL TO BINARY CONVERSION MACHINE
Filed Nov. 29, 1950     9 Sheets-Sheet 3

Inventors
ALDRED W. BOWYER   JOHN R. CARTWRIGHT
By
Attorney.

A. W. BOWYER ET AL 2,647,689

DECIMAL TO BINARY CONVERSION MACHINE

Filed Nov. 29, 1950

Inventors
ALDRED W. BOWYER    JOHN R. CARTWRIGHT

By
Attorney.

Aug. 4, 1953  A. W. BOWYER ET AL  2,647,689
DECIMAL TO BINARY CONVERSION MACHINE
Filed Nov. 29, 1950                             9 Sheets-Sheet 7

ALDRED W. BOWYER  JOHN R. CARTWRIGHT
Inventors
By
Attorney

A. W. BOWYER ET AL 2,647,689

DECIMAL TO BINARY CONVERSION MACHINE

Filed Nov. 29, 1950

Inventors
ALDRED WILLIAM BOWYER
JOHN ROBERT CARTWRIGHT

By Frederick E. Hane
Attorney

Patented Aug. 4, 1953

2,647,689

UNITED STATES PATENT OFFICE 2,647,689

DECIMAL TO BINARY CONVERSION MACHINE

Aldred W. Bowyer and John R. Cartwright, Letchworth, England, assignors to British Tabulating Machine Company Limited, London, England, a British company Application November 29, 1950, Serial No. 198,068
In Great Britain December 15, 1949

21 Claims. (Cl. 235—60.38)

This invention relates to keyboard operated record card punching machines and more particularly to such machines in which the number to be punched is expressed in one notation, and means are provided for automatically translating this value to a second notation and punching the value expressed in this second notation.

The use of the binary notation leads to considerable simplification in calculations involving multiplication and division. Thus it may be desirable to design large scale digital computing machines to operate in this notation, even though the initial data will normally be expressed in the decimal notation and thus require translation before entry. When the entry of data for such a machine is effected by the sensing of punched record cards, it is convenient for the cards to record the data in binary form.

Accordingly, it is an object of the present invention to provide a record card punching machine in which the operation of keys representing a decimal value causes the binary equipment of this value to be punched in the record card.

According to the invention, a key operated automatic punch punches in a record in a single line in step by step manner the binary equivalent of a value set on a keyboard in decimal notation.

In the preferred form of the invention, the decimal value set on the keyboard is transferred to a first group of registering relays, from which half the value is transferred to a second group of relays, this halved value then being re-registered on the first group. This alternate transfer takes place for a fixed number of cycles at least sufficient in number to reduce the successively halved value to zero. For each value an indication is obtained of whether the value is even or odd and this is used to control the operation of the spacing and punching mechanism of the punch.

The invention will now be described, by way of example, with reference to the accompanying drawings, in which.

Although the invention may be applied to various forms of keyboard operated card punches and verifiers, it will be described by way of example as applied to a punch of the type shown in United States Patent 1,976,618 as modified by a readout means as seen in Figures 4b, 5 of 2,318,299 which will hereinafter be termed "the reference patent."

Keyboard

Figure 1:
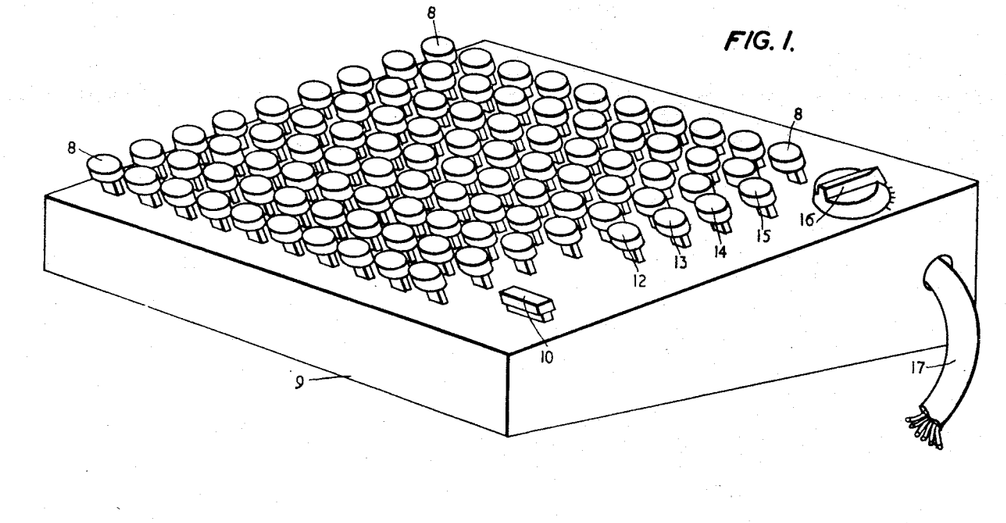
Figure 1 shows a perspective view of the keyboard.
Figure 2:
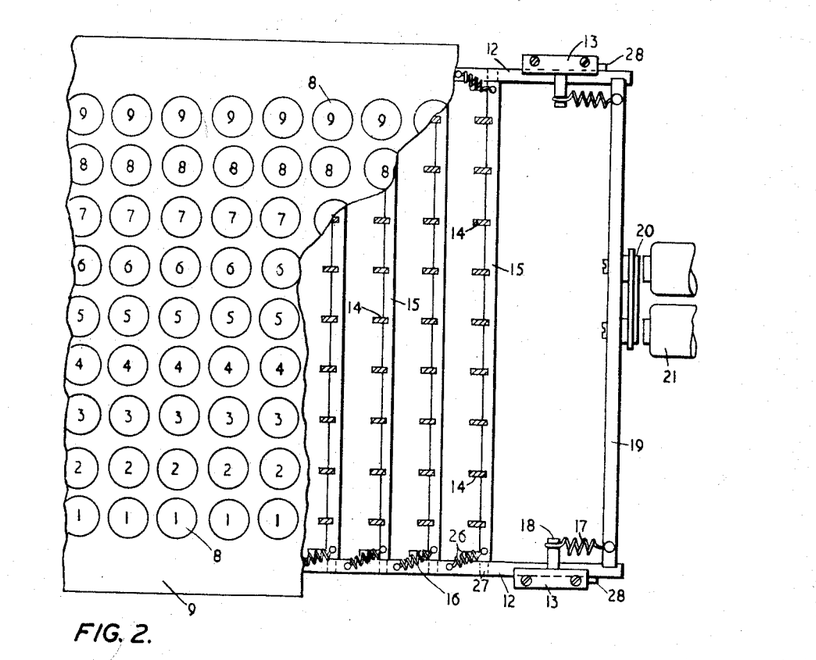
Figure 2 is a partial plan view of the keyboard.

The decimal data which is to be punched is set up on a multi-denominational keyboard 9 (Figure 1). The keyboard, which is connected to the punch by a cable 17, provides keys for entry of a ten denomination number, the keys 8 being divided into ten vertical columns representing the denominations $10^0$ to $10^9$, the lack of any punching in a vertical column representing zero (0). Horizontally, the lowest row of keys represents the digit 1, the second row the digit 2, and so on up to 9 (Figures 1 and 2). No keys for 0 are provided, so that if the digit 0 occurs in the value to be set, no keys are depressed in the related denominational row.

Four keys 12, 13, 14 and 15 are provided to allow control of machine functions incidental to punching. Key 12, the Punch key is used to initiate punching after the decimal number has been set up on the keyboard. The Release key 13 allows the card to be freed to move to the last column position for ejection. The Binary key 14 provides for direct key operation of the punch selector magnets independently of the decimal keyboard setting. The Clear key 15 permits all the depresed decimal keys to be released at will.

A space bar 10 operates directly the spacing mechanism of the punch so that column spacing may be effected when the automatic spacing controlled by the translating mechanism is not in operation.

A manually settable 12-position rotary switch 16 selects one of the twelve punch selector magnets for operation. The space bar bar 10 and the operation keys 12, 13, 14 and 15 are of the non-locking type. The entry keys 8 are held locked in their depressed positions until released electro-magnetically. This enables the operator, having set up the required decimal number, on the keyboard, to check that it has been correctly set up before depressing the Punch key to initiate the automatic punching of the binary equivalent.

Figure 3:
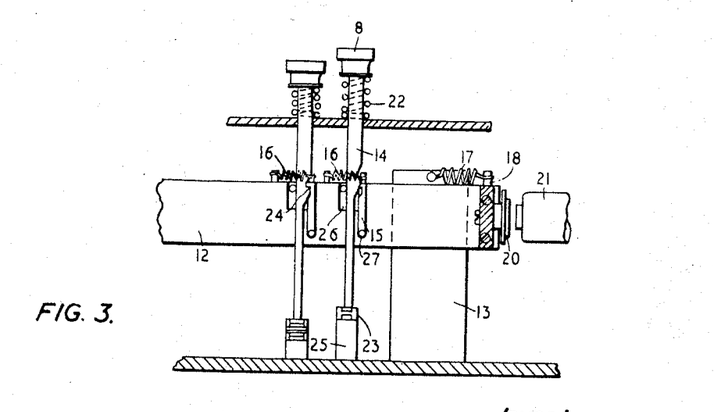
Figure 3 is a detail view of the key and key contact mechanism.

The mechanism employed for locking and releasing the keys is shown in detail in Figures 2 and 3. Each key 8 is provided, as is usual, with a compression spring 22, surrounding key shank 14, and tending to hold the key in the upper position. The key shank 14 has a locking projection 24 which is engaged by the upper end of a key lock bar 15 when the key is depressed, thus holding the key in the lower position. The bars 15 extend the length of a vertical column of keys 8, one bar being provided for each row (Fig. 2). At each end of bars 15, longitudinally considered, the bars 15 are pivotally attached to slide bars 12 by pins 27. Springs 16 fixed at one end to the slide bar and at the other to the key lock bar 15 tend to rotate the bar 15 in an anti-clockwise direction (Figure 3) and thus hold it against stops 26 secured to the slide bars.

When a key 8 is depressed the related bar 15 is moved clockwise against the action of the spring 16 until the top end of the bar is able to engage the projection 24 in the key shank. If a second key 8 in the same vertical column is depressed, the bar 15 is again moved clockwise, so that before the second key is latched, the first key will be unlatched and returned by the spring 22 to the upper position. This is ensured by providing a very slight taper on the part of the bar 15 which engages the projection 24. The taper is such that the bar 15 needs to move through a lesser arc to disengage it from the projection 24 than to engage it. Consequently, as the second key is depressed, the projection of the first key is disengaged from the bar and then rides up the tapered edge of the bar under the action of the spring 22. Thus depression of a key effects the return to the upper position of any previously latched key in the same column.

The slide bars 12 are held together at each end by bars 19, the right hand bar 19 being shown in Figure 2. The bars 12 are mounted in four brackets 13, two brackets being shown in Figure 2, near to each end of the bars, in such a manner as to allow of horizontal movement. Two springs 17 secured to the bar 19 and pins 18 on the brackets 13 at the right hand end tend to move the slide bars 12 to the left (Figure 2). This movement is limited by stops 28 on the bars 12 contacting the brackets 13. The springs 17 are stronger than the springs 16, so that depression of a key causes pivoting of the bar 15 and without appreciable movement of the bars 12.

The right hand bar 19 has secured to it an armature 20 which is attracted when electro-armature 21 is energized. When magnet 21 is energized, the bars 12 are moved sufficiently far to the right (Figure 2) for the bars 15, engaging with stops 26, to be drawn clear of the key shanks 14, so that all depressed keys are released for restoration by their springs 22.

The key shanks 14 extend downwardly to engage with a stack of one or more contacts 23 mounted on an insulating block 25. The number of contacts depends upon the decimal value of the key; however they are so adjusted that the uniform stroke of the key causes closure of all the contacts associated with that particular key.

The contacts 23 serve to convert the decimal representation of each digit to an equivalent representation in the code 1, 2, 4, 8. This is effected for each denomination by the circuit shown in Figure 4. A circuit is made from the supply line 28, through the closed contacts 23 associated with a particular decimal key which has been depressed to the appropriate combination of the output lines 29. Thus if the decimal key value 3 is depressed, then circuits are made to the lines 29 values 1 and 2. It will be appreciated that one such conversion circuit is provided for each decimal denomination.

Relay translating circuit

Figure 5:
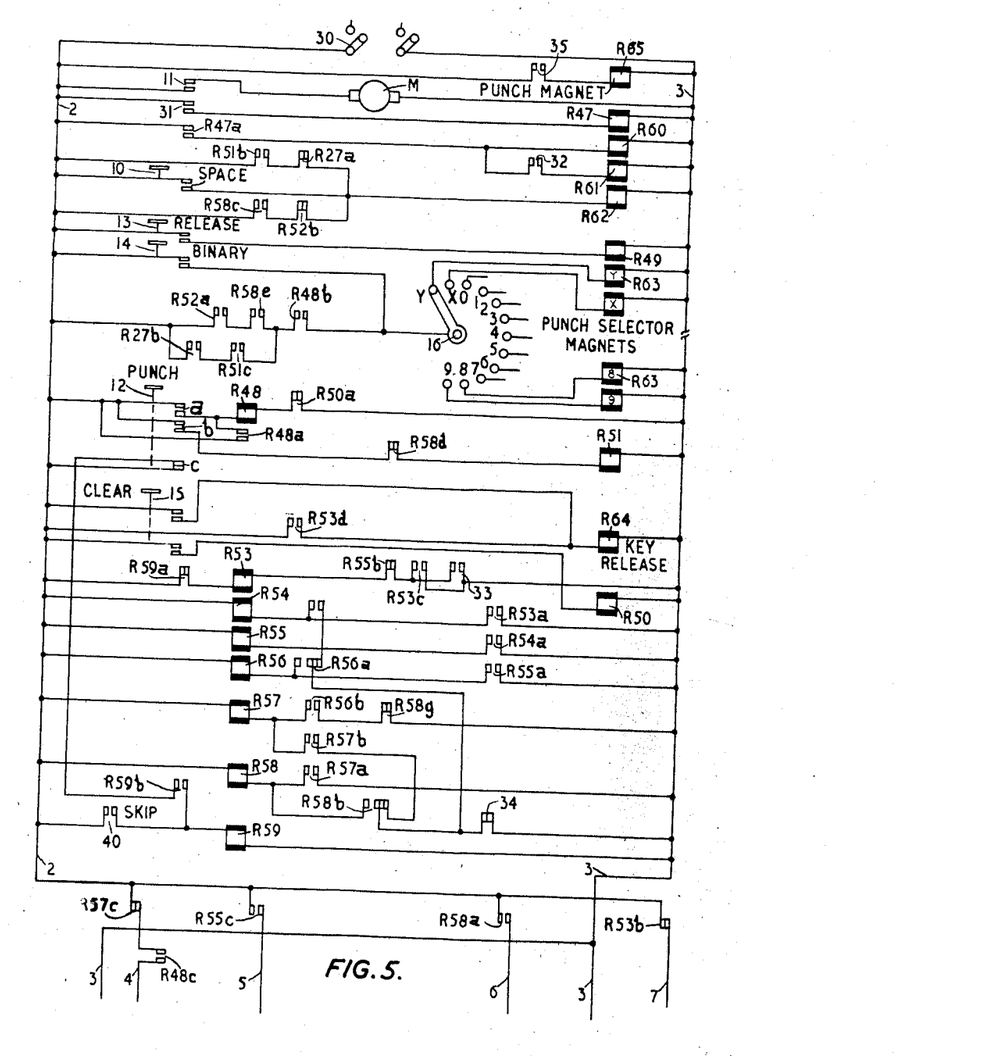
Figure 5 is a circuit diagram of the control circuits.
Figure 5A:
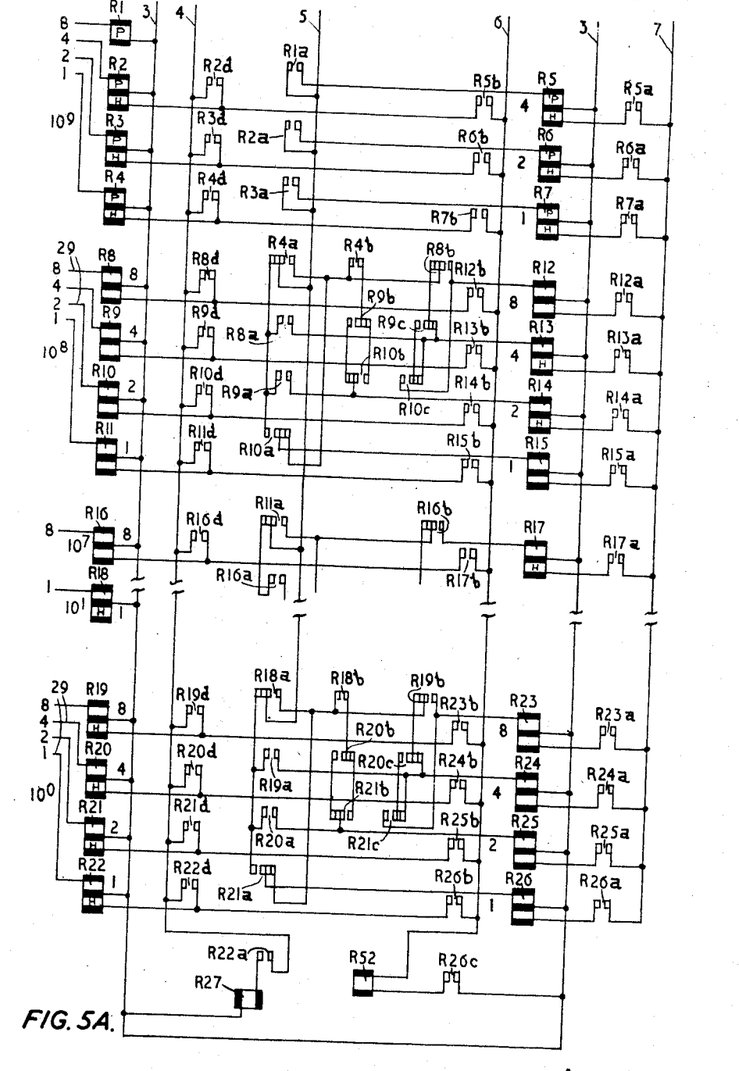
Figure 5A is a circuit diagram of the relay circuit for effecting successive halving of a decimal value expressed in the code 1, 2, 4, 8.

The translation of the decimal number, set up on the keyboard, to the binary equivalent may be effected by the circuit shown in Figure 5A.

The method employed is that of performing successive halving operations on the entered value and determining at each operation whether the units digit is even or odd. If the digit is odd, then a binary digit is present in the corresponding binary denomination and the fact is recorded by punching a hole in the card in the proper columnar position.

By way of example, the translation of the decimal number 129065 will be considered. During halving, an odd units digit is treated as the next lower even digit and halving is continued until the value is reduced to zero.

| Value | Binary Digit | Binary Index |
|---|---|---|
| 129065 | 1 | 0 |
| 64532 | 0 | 1 |
| 32266 | 0 | 2 |
| 16133 | 1 | 3 |
| 8066 | 0 | 4 |
| 4033 | 1 | 5 |
| 2016 | 0 | 6 |
| 1008 | 0 | 7 |
| 504 | 0 | 8 |
| 252 | 0 | 9 |
| 126 | 0 | 10 |
| 63 | 1 | 11 |
| 31 | 1 | 12 |
| 15 | 1 | 13 |
| 7 | 1 | 14 |
| 3 | 1 | 15 |
| 1 | 1 | 16 |
| 0 | 0 | 17 |

Thus the decimal number 129065 is expressed by the sum of the following binary powers:

$$2^{16}+2^{15}+2^{14}+2^{13}+2^{12}+2^{11}+2^{5}+2^{3}+2^{0}$$

that is 11111100000101001 in the binary notation.

| | |
|---|---|
| $2^0$ | 1 |
| $2^3$ | 8 |
| $2^5$ | 32 |
| $2^{11}$ | 2048 |
| $2^{12}$ | 4096 |
| $2^{13}$ | 8192 |
| $2^{14}$ | 16384 |
| $2^{15}$ | 32768 |
| $2^{16}$ | 65536 |
| | 129065 |

In Figure 5A are shown the relays pertaining to the decimal denominations $10^9$, $10^8$ and $10^0$ and certain relays pertaining to the denominations $10^7$ and $10^1$. The circuits for the denominations $10^1$ to $10^7$ are similar to that of the denomination $10^8$.

When the decimal number is set up by depressing the keys 8 on the keyboard 9, the related contacts 23 (Figure 2) will be closed and through the circuits shown in Figure 4, one or more of the lines 29 will be made live in each denomination in which a key was set. These lines 29 are connected (Figure 5A) to four relays in the appropriate denomination. Thus if the digit 7 is set in the denomination $10^8$, then the lines 29 (1), (2) and (4) in this denomination will be connected to the supply line, so energizing relays R9, R10 and R11. In this manner, the decimal value is registered on the relays on the left hand of Figure 5A, expressed in the code 1, 2, 4, 8, in each denomination.

If the decimal number is odd, then the "1" value relay R22 in the units denomination will be energized, closing contacts R22a. Thus a circuit for energizing relay R27 will be prepared from line 4, relay contacts R22a (shifted), relay R27 to line 3. This relay R27, if energized, causes a punch selector magnet to operate, thus punching a hole in the column of the card which is under the punches. If relay R27 is not energized, then an automatic spacing operation without punching occurs to move the next column of the card under the punches. Relay R27 is effective only during punching of the first column of the card i. e. when the value registered on the left hand group of relays agrees with that set up on the keyboard.

Half the value registered on the left hand group of relays (Figure 5A) is entered on the right hand group of relays by the circuits made from line 5 through the networks comprised by the contacts of the left hand group of relays. The keys 8 are then automatically reset, thus de-energizing all the left hand group of relays.

The value registered on the right hand group of relays is then entered on the left hand group of relays and at the same time relay R52 is energized if the value is odd. The energization or non-energization of relay R52 controls punching or spacing as in the case of relay R27.

The right hand group of relays are de-energized and then re-energized to represent half the value registered on the left hand group. The cycles then continue as described with successive transfers and accompanying spacing or punching controlled by relay R52 until they are automatically stopped after a given number of columns of the card have moved past the punch position. The operation of these circuits will be described in greater detail in connection with the operation of the machine as a whole.

*Card*

Figure 8:
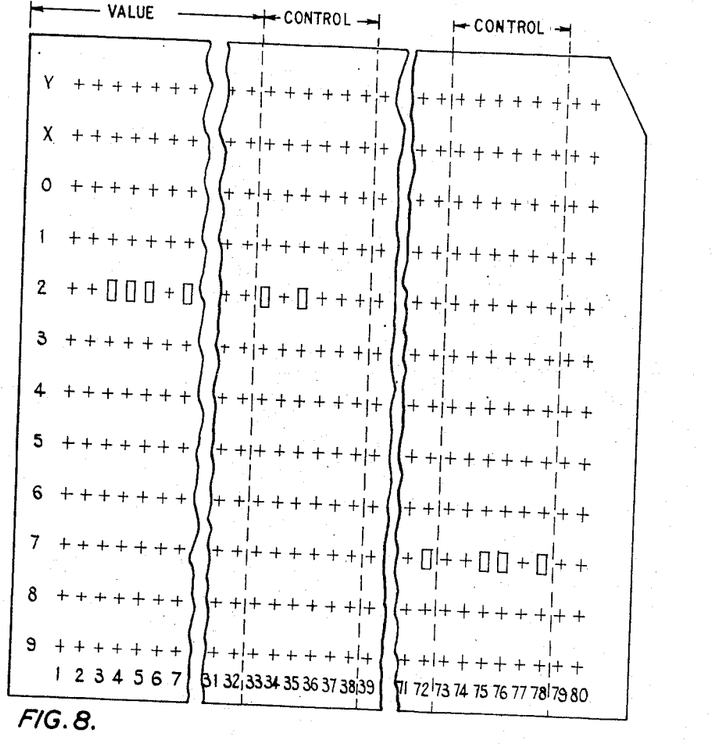
Figure 8 shows a record card suitable for use with a punch constructed according to the invention.

Figure 8 shows one way in which an 80-column record card of well known type may be utilized for recording binary values, only parts of the card being shown.

Along the lower edge of the card are shown the column numbers and along the left hand edge the index point positions which obtain when such a card is used for recording decimal numbers in normal accounting operations.

The card is divided into two main sections or "fields," columns 1–38 and 41 to 78. Each of these fields is sub-divided into two further fields, a value field of 32 columns and a control field of 6 columns. In the value field, each binary number is recorded horizontally across the card, by punching a hole where a binary digit occurs and leaving a space where a binary nought occurs. Since there are twelve index point positions, it is possible to record twelve binary numbers, each of thirty-two digits in each of the two value fields. As an example, in index point position 2 is shown recorded the binary number 1011100. It will be appreciated that the decimal number to be punched must be such that it may be expressed by the sum of a series of binary terms, the highest of which is $2^{31}$.

The control field is provided to allow operational instructions relating to the particular number to be recorded. Thus, according to a particular code, the punching in columns 33 and 35 might mean that the value recorded in index point position 2 of the first value field was to be read into a particular storage unit of the computer and the punching in the second control field in index point position 7 that the related value was to be squared.

In the present machine, the index point position in which recording is to take place is determined by setting the switch 16 (Figures 1 and 5) to the appropriate position, thus selecting the related punch selector magnet. The card is then positioned in the punch carriage so that either column 1 or column 41 is under the punches, depending upon which value field is to be punched.

After the decimal number has been set on the keyboard, the Punch key 12 (Figure 1) is depressed. The decimal number will then be automatically translated to the binary value, and this will be punched in the chosen position on the card. If the binary number is of less than thirty-two digits, the card will be automatically spaced so that finally the first column of the control field lies under the punches. The card carriage is halted at this point by a stop clip, the use of which is well known in connection with this type of punch.

Any required data may now be inserted in the control field by operation of the Binary key 14 (Figure 1) and the space bar 10, the Binary key effecting punching in the same index point position as that in which the value has been recorded. Finally, the Release key 13 may be operated to allow the card to move to the last column position for ejection to the card hopper. If the first field has just been punched and it is required to punch a number in the second field, the card may be manually spaced to column 41, the new number set on the keyboard, the switch 16 reset if necessary, and a second operation carried out.

The card punched in the way set out above may be sensed whilst at rest or in motion by any well known means, in order to read the punched information into the computer or other machine. If sensing whilst in motion is utilized, it is preferable to feed and sense the card in endwise manner, that is, in substantially the same manner as that in which it is fed in the punch.

*Control circuits*

Although the punch mechanism employed is substantially similar to that of the reference patent, the control circuits differ considerably and will therefore be described in some detail.

Figure 12:
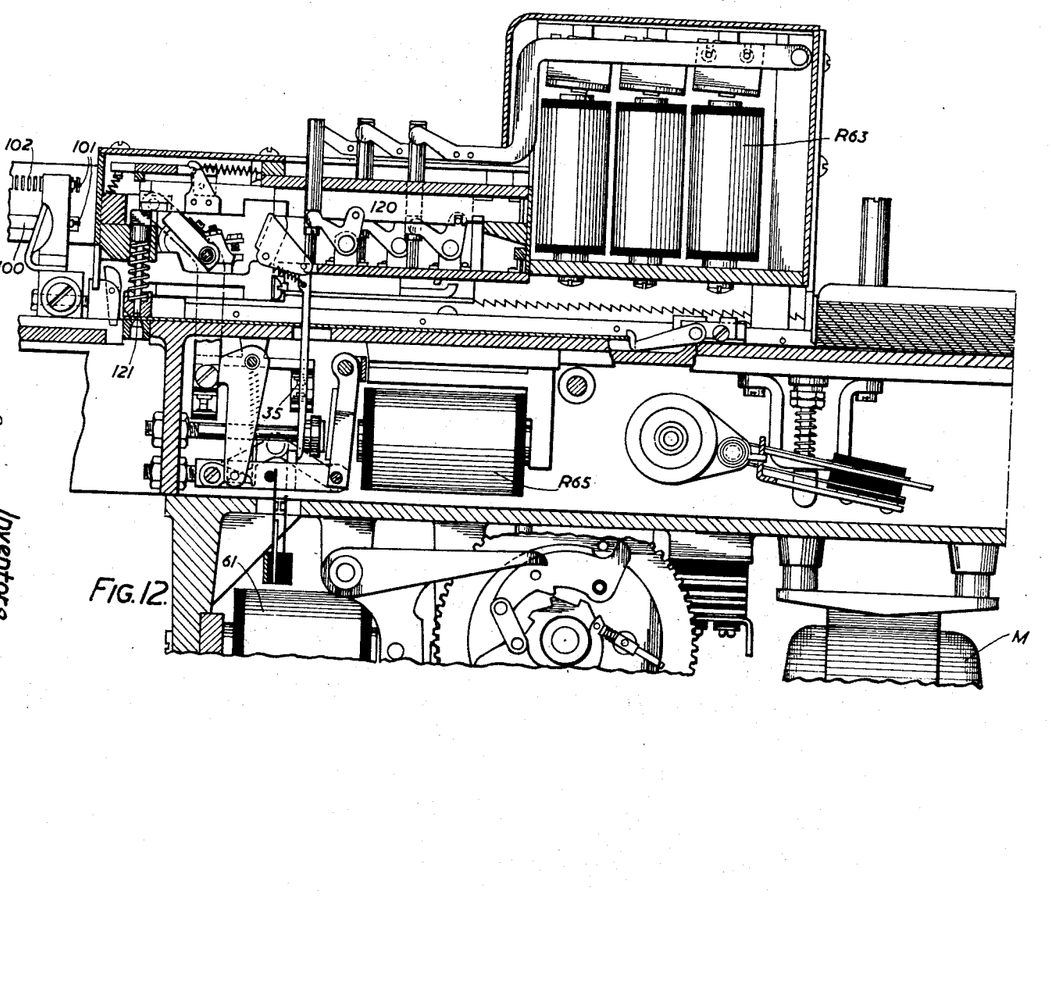
Figure 12 is a partial section of the punch showing the punching mechanism and generally corresponds to Figure 5 of U. S. Patent No. 2,318,299.

When main switch 30 (Figure 5) is closed, lines 2 and 3 are connected to the power supply. With the card carriage in the last column position to which it will normally be set when the machine is first brought into operation, the contacts 31 are closed so that relay R47 will be energized. The contacts 31 are mounted adjacent to the punch carriage and are engaged by a projection thereon so as to be closed only when the carriage is at the last column position. Operation of relay R47 causes the motor control contacts 11 to be closed and latched, thus completing the circuit for the motor M. As described in the reference patent, the motor M (Figures 5 and 12) will return the card carriage and cause the feeding of a card on to the carriage. The contacts 11 will be unlatched mechanically when the gear driving the carriage reaches the extreme position, that is, when the carriage is at the point of card pick up.

The contacts 11 are latched in the following manner: When relay R47 is energized, contacts R47a close and complete a circuit to the eject magnet 60. The eject mechanism operates, without result in this case, since there is no card in the carriage. However, the operation of the eject mechanism closes contacts 32, the spring loaded rack which moves to shift the card gripper also engaging an insulating block attached to one of the contacts 32 to thereby close the contacts. A circuit is then made from line 2, relay contacts R47a (shifted), contacts 32 (shifted), magnet R61 to line 3. The movement of the armature of the magnet 61 (Figures 5 and 12) closes and latches the contacts 11 and also operates to engage the clutch of the motor M, so that drive is transmitted to the shaft controlling movement of the card carriage.

Depression of the Space key 10 closes the space contacts to provide a circuit to space magnet 62, to cause a single column spacing of the card carriage. The Release key 13 on closure provides a circuit to magnet R49. The magnet R49 when energized, causes the card carriage to be released to the last column position in the usual manner.

One of the punch selector magnet R63 (Figures 5 and 12) is connected into circuit by setting the switch 16 and the chosen magnet may then be energized either by depression of the Binary key 14, or through the chain of relay contacts, that is, with R52a and R58e or R27b and R51c closed and with R48b closed.

When one of the selector magnets is energized, it selects the related punch 121 for operation by moving an interposer 120 and this also causes punch bail contact 35 to close, thus energizing punch magnet R65, which actually causes punching to take place and also allows subsequent spacing of the card to the next column, as explained in the reference patent.

Key release magnet R64 (Figure 5) referenced 21 in Figure 2, may be operated by depression of the Clear key 15 or by closure of contacts R53d.

Relays R53 to R58 form a timing circuit which governs the successive halving and transfer of the decimal value by the relay groups shown in Figure 5A. The start of the cycle of operation is determined by the closing of contacts 33 and the end by the opening of contacts 34. These two sets of contacts are operated by the spacing mechanism of the punch, thus interlocking the operation of the relay halving circuit with the mechanical operation of the punch, the overall speed of the machine being determined by the speed of operation of either the relay circuit or the punch, whichever is the slower.

Figure 10:
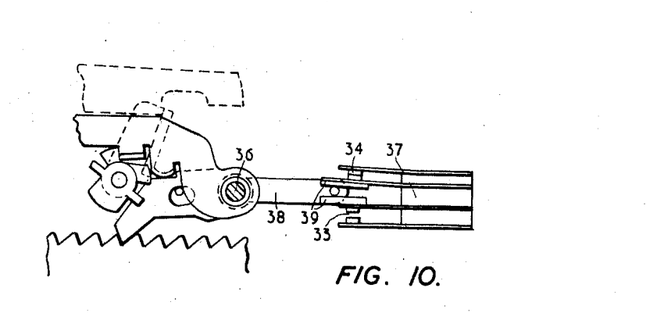
Figure 10 is a detail view of part of the punch escapement mechanism.

In Figure 10 is shown a partial view of the escapement mechanism of the punch. Shaft 36 is rocked clockwise by the movement of the punch actuating plate (not shown) to effect spacing. Attached to the shaft 36 is an arm 38 carrying at the other end two insulating strips 39. The strips 39 engage the spring contact blades of the contacts 33 and 34 which are mounted on an insulating block 37, so that when shaft 36 rocks to initiate a spacing movement of the card carriage, contacts 33 are closed and contacts 34 are opened. Except when shaft 36 is rocked clockwise and then returned to normal position at the beginning of the spacing operation, the contacts are in the position shown in Figure 10.

*Machine operation*

In order to illustrate the sequence of operations which take place during the translation of the decimal number and punching of the binary equivalent, a typical example will now be considered.

It will be assumed that the value to be translated is 1073741917. This value is set up on the keyboard 9 (Figure 1) by depressing the appropriate keys 8, which remain locked in the lower position, closing the related contacts 23.

In the denomination $10^9$ the 1 value key is depressed so that a circuit will be made from line 28 (Figure 4), which is connected to line 2 (Figure 5A) by a line not shown, through the closed contact 23 (1), line 29 (1), the value 1 relay, R4 in denomination $10^9$ (Figure 5A), to line 3.

In the denomination $10^8$, the value "0" is to be entered so that no keys are depressed and no circuit is made to the relays in that denomination.

Figure 4:
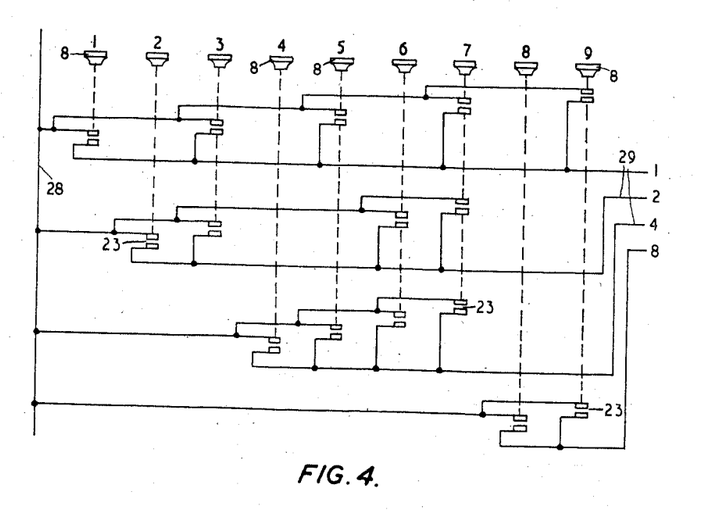
Figure 4 is a circuit diagram showing one denomination of the key contacts for expressing the decimal value in the code 1, 2, 4, 8.

In the denomination $10^0$, the value "7" key is depressed thus making circuit in parallel from line 28 to the lines 29 (1), 29 (2) and 29 (4) as will be seen from Figure 4. Thus the relays R22, R21 and 20 will be energized (Figure 5A). In similar manner, the appropriate relays in the intermediate denominations will be energized to register the decimal value in the code, 1, 2, 4, 8, in each denomination.

Since no circuits are established at this time to the holding coils of relays R1, R2, etc., if a value has been incorrectly set on the keyboard it may be corrected and the relays relating to the incorrect setting will be de-energized by the breaking of the circuits through the key contacts. This connection may be effected by depressing the correct key when, as already explained, the incorrectly set key will be released to the upper position or by depressing the Clear key to energize the key release magnet R64 (Figure 5), thus clearing all the set keys and then reentering the complete number.

When the decimal number has been correctly set on the keyboard, the Punch key 12 (Figures 1 and 5) may be depressed to start the translating and punching operation, it being assumed that a card has been positioned with column 1 under the punches and that switch 16 has been set to select punching in the required line of the card, for example, that corresponding to digit position 2.

On depressing the Punch key (Figure 5), a circuit is made from line 2, key contacts 12a (shifted), relay R48, contacts R50a (normal) to line 3, to energize relay R48, which sets up a holding circuit through the shifted contacts R48a. Contacts R48c close to provide a circuit from line 2, contacts R57c (normal), contacts R48c (shifted), line 4 (Figures 5 and 5A), through the shifted d contacts of any relays of the left hand group which are energized, the hold coils of the same relays, to line 3.

If the value of the entered number is odd, then relay R22 in the denomination 10⁰ will be energized and there will be a circuit from line 4, contacts R22a (shifted), relay R27 to line 3.

The closing of the Punch key also makes a circuit from line 2 (Figure 5), key contacts 12b, contacts R58d (normal), relay R51 to line 3. Relay R51 closes the contacts R51c to energize the "2" punch selector magnet, from line 2, contacts R27b (shifted), contacts R51c (shifted), contacts R48b (shifted), "2" position of switch 16, "2" punch selector magnet R63 (not shown) to line 3. The punch selector magnet operates the "2" punch interposer which also closes the punch bail contacts 35, thus energizing the punch magnet R65, to cause operation of the punch and consequent spacing of the card carriage to the next column position. Thus a perforation is punched in column 1 of the card at the "2" digit position.

In the example being considered, the units figure is seven, so that relay R27 is operated. If the units figure had been even, the relay R27 would not have been energized and alternative circuit would have been set up from line 2, contacts R51b (shifted), contacts R27a (normal), magnet R62 to line 3. The magnet R62 is the space magnet, so that, in this case, the card carriage is spaced to the next column without punch operation.

In spacing to the next column, the shaft 36 (Figure 10) is rocked, thus closing contacts 33 (Figure 10 and Figure 5). Relay R53 is then energized by a circuit from line 2, contacts R59a (normal), relay R53, contacts R55b (normal), contacts 33 (shifted), to line 3, and the contacts R53c close to provide a holding circuit across contacts 33.

The contacts R53b shift to break the circuit from line 2 to line 7, thus breaking the holding circuits of the relays in the right hand group of Figure 5A. Since, at this stage, no value is registered on them, the operation is redundant. Contacts R53d close to energize the key release magnet R64, thus returning all keys to the upper position and opening all the contacts 23.

Contacts R53a (Figure 5) close, thus energizing relay R54. The contacts R54b then provide a holding circuit from line 2, relay R54, contacts R54b (shifted), contacts R56a (normal), contacts 34 (normal) to line 2, which is completed when the escapement shaft 36 returns to normal position, thus closing contacts 34. Relay R55 is energized by the closing of contacts R54a.

Contacts R55c close to complete a circuit from line 2, contacts R55c (shifted) to line 5. From line 5 a number of parallel circuits are made through the contacts of operated relays of the left hand group (Figure 5) so that the relays of the right hand group are energized to register half the value registered on the left hand group.

In denomination 10⁹, relay R4 (Figure 5A) is energized whilst in denomination 10⁸ no relays are energized, to register the first two digits 10 of the value 1073741917. A circuit will be made from line 2, contacts R55c (shifted), (Figure 5), line 5, contacts R4a (shifted) (Figure 5A), contacts R8b (normal), contacts R9b (normal), relay R13 to line 3. A parallel circuit runs from contacts R4a (shifted), contacts R10a (normal), relay R15, to line 3. Thus relays R13 and R15 are energized to represent the value "5" in denomination 10⁸.

In denomination "10¹" the value registered is "1," so that relay R18 is energized, whilst in denomination 10⁰, relays R20, R21 and R22 are energized to register the value "7." In consequence, at this time, there will be a circuit from line 5, contacts R18a (shifted), contacts R19b (normal), contacts R20c (shifted), contacts R21c (shifted), relay R23, to line 3. Thus "8" is registered by the energization of relay R23, as the result of halving seven and adding a carry of value five from the higher denomination.

In similar manner, the right hand group of relays in the intermediate denominations will be energized appropriately, to register half the initial value, that is, the value 536870958 on the right hand group of relays.

Contacts R55b open to break the holding circuit of relay R53, which is thus de-energized allowing contacts R53b to close, so establishing holding circuits for the energized relays of the right hand group through their a contacts from line 7. For example, one such circuit runs from line 2, contacts R53b (normal) (Figure 5), line 7, contacts R13a (shifted) (Figure 5A), relay R13 to line 3.

Contacts R55a close to establish a circuit from line 2, relay R56, contacts R55a (shifted) to line 3. Relay R56 establishes a holding circuit through contacts R56a (shifted) and contacts 34 (normal), and in so doing breaks the holding circuit for relay R54 at contacts R56a, thus de-energizing relay R54, which in turn de-energizes relay R55. Accordingly, contacts R55c open, breaking the circuit to line 5, holding circuits for the right hand group of relays having been established from line 7.

Contacts R56b close to energize relay R57, from line 2, relay R57, contacts R56b (shifted), contacts R58g (normal), to line 3. Contacts R57c then open to break the holding circuit for the left hand group of relays of Figure 5A from line 4, so that zero is then registered on this group.

Contacts R57b close to provide a holding circuit through contacts R58b (normal) and contacts 34 (normal). Contacts R57a also close to energize relay R58. A holding circuit is then established from line 2, relay R58, contacts R58b (shifted), contacts 34 (normal), to line 3. The shifting of contacts R58b also breaks the holding circuit for relay R57, thus de-energizing this relay and restoring the holding circuit for the left hand group of relays through contacts R57c.

Contacts R58a close to provide a circuit from line 2, contacts R58a (shifted), line 6, contacts R13b (shifted), relay R9 to line 3. Similar circuits will be set up through the b contacts of all the right hand group of relays which are energized to cause registration on the left hand group of relays of the number already registered on the right hand group.

Contacts R58d shift to open the circuit to relay R51 as a safety measure, in case the Punch key 12 (Figure 5) has been held depressed longer than is necessary.

Since the value 8 is registered in the lowest denomination of the right hand group of relays, relay R52 (Figure 5A) will not be energized through the contacts R26c, so that the space magnet R62 will now be energized from line 2, contacts R58c (shifted), contacts R52 (normal), magnet R62 to line 3. This will cause spacing of the card carriage to the next column without punching taking place. Operation of the spacing mechanism will, as already explained, close contacts 33 and open contacts 34, thus de-energizing relay R58 and energizing relay R53 for the start of the next cycle of operation.

Figure 9:
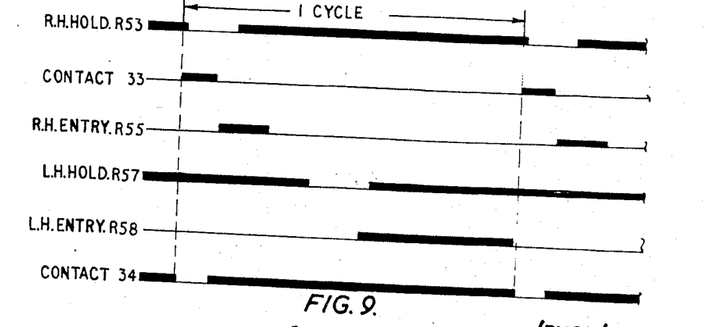
Figure 9 is a timing chart.

The relative timing of the various operations is shown in Figure 9. The space contact 33 opens and breaks the holding circuit for the right hand group of relays (Figure 5A) which is re-made when relay R55 operates (R. H. hold R53). Relay R55 in operating also makes the circuit to line 5 to cause registration of half the value on the right hand group of relays (R. H. entry R55). The registration having been effected, the hold circuit for the left hand group of relays is broken to return their registration to zero (L. H. hold R57). They are then re-energized to register the value registered on the right hand group of relays, this circuit being broken when contact 34 opens (L. H. entry R58).

With relay R53 energized, a second cycle of operations will commence and will carry through the same sequence of operations as described above. At the end of this cycle, both sets of relays will be registering the value 268435479, being half the value registered on the previous cycle. Since the last digit is odd, relay R26 and, consequently, relay R52, will be energized. There will thus be a circuit from line 2, contacts R52a (shifted), contacts R58e (shifted), contacts R48b (shifted), selector magnet 2, to line 3, to cause punching of a hole in column 3 and spacing to the next column.

In this manner, the cycling will proceed automatically until column 32 of the card is reached. If the decimal number is reduced to zero by successive halving before this time, then automatic spacing will take place until column 32 is reached. This is so, since relay R52 cannot be energized under these conditions.

As already noted, when the punches are over the first column of the control field of the card, automatic operation must be suspended and this is effected by the skip-stop mechanism closing the skip contact 40. Relay R59 is then energized and holds on through the shifted contacts R59b. Contacts R59a open to break the circuit to relay R53, thus preventing further automatic cycling. When the Punch key is depressed to commence punching of a new decimal number, the hold circuit for relay R59 is broken at the key contacts 12c. The relay R48 should be deenergized before operating the Punch key again, by depressing the Clear key 15 which energizes relay R50, thus opening contacts R50a in the holding circuit of relay R48.

Having reached the end of the value field, any required data may be recorded in the control field (Figure 8) by appropriate operation of the Binary key which operates the chosen punch selector magnet 63 directly and the Space key (Figure 5).

Figure 6:
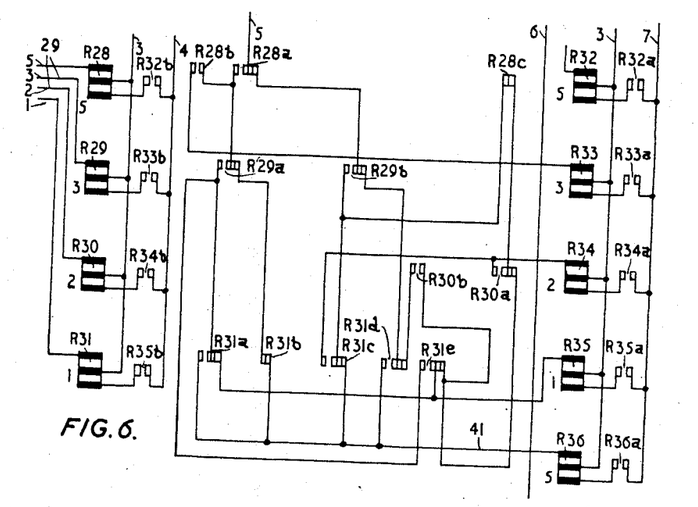
Figure 6 is a circuit diagram of the relay circuit for effecting successive halving of a decimal value expressed in the code 1, 2, 3, 5.

In certain applications, the decimal value may already be available in coded form, such as, for example, the code 1, 2, 3, 5. In Figure 6 is shown one denomination of a relay circuit suitable for use with this code, and which may replace the circuit shown in Figure 5A.

For example, the lines 29 (1) and 29 (5), in Figure 6, may have been energized to indicate the value "9," thus operating relays R28, R29 and R31. When line 5 is energized, there will be a circuit from line 5, contacts R28a (shifted), contacts R28b (shifted), relay R33 to line 3, and a further circuit from line 5, contacts R28a (shifted), contacts R29a (shifted), contacts R31e (shifted), relay R35 to line 3, thus registering the value "4" on relays R33 and R35. The carry of five to the next lower denomination is registered on relay R36 by a circuit from line 5, contacts R28a (shifted), contacts R29a (shifted), contacts R31a (shifted), relay R36 to line 3.

It will be appreciated that a number of denominational units as shown in Figure 6, may be combined to form a multi-denominational unit of the same form as that of Figure 5A, which has already been described. Each denominational unit would consist of groups of relays similar to R28 to R35. In the lowest denomination, the line 41 would be connected to relay R52 (Figure 5A) to operate it when the number registered was odd.

Figure 7:
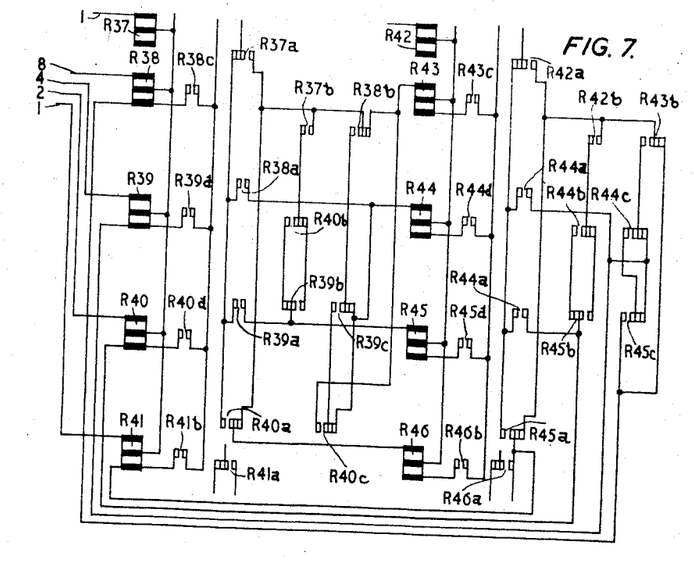
Figure 7 is a circuit diagram of an alternative relay circuit for effecting successive halving of a decimal value expressed in the code 1, 2, 4, 8.

If the punch is designed to operate at high speeds, it may be desirable to increase the speed of operation of the relay halving circuits. This may be achieved by the use of a modification (Figure 7) of the circuit of Figure 5A.

In the circuit initially described, the value is halved only when transferring from the left hand group of relays to the right hand group. In the modified form, halving is effected when transfer takes place in either direction. The relays R38 to R41 (Figure 7) are similarly connected to relays R8 to R11 (Figure 5A), so that half the value is transferred to the relays R43 to R46. These latter relays are also provided with contacts wired in similar manner, so that in transfer to the relays R38 to R41, the value is again halved. In the lowest denomination the two relays corresponding to R27 and R52 (Figure 5A) are so connected that their contacts are alternatively effective to control punching and spacing, instead of that corresponding to R27 being effective only during punching of the first column of the card, as described in connection with the operation of the complete circuit of Figure 5A.

It may be desirable to combine the value and control fields into a single field, and punch several numbers consecutively within the field. As an example, the case will be considered in which the full field of 38 columns is used for recording three separate numbers, twelve columns being allocated to the first number, twelve columns to the second number, and the remaining fourteen columns to the third number.

The keyboard is split into three sections of four, four and five decimal denominations respectively. Each section is provided with independent key release mechanisms each similar to that used for the full keyboard. Since the first number has a maximum of twelve binary digits, the corresponding decimal number is 8191, which is within the compass of the four denominations of the first section of the keyboard. Similarly, the second number also requires four denominations and the third number requires five denominations, the greatest possible decimal number being 32767.

The three decimal numbers are set on the appropriate sections of the keyboard. When the Punch key 12 is depressed, the first number is set up on the translating relays as previously described and punching of the equivalent binary number occurs until the thirteenth column is reached. The second number is then transferred from the second section of the keyboard to the translating relays and controls punching of the next twelve columns. Finally, the third number is transferred to control punching of the remainder of the field. The translating circuits used may be any one of those already described, although that of Figure 5A will be particularly referred to. The modifications and additions necessary to the control circuit of Figure 5 are shown in Figure 11.

A column selector (Figures 11 and 12) similar to that described in the reference patent and comprising a common contact strip 100, a brush 101 and individual contact strips 102, is employed to control the sequential transfer of the numbers. When the punches are over column 1 of the card, the brush 101 joins the strip 100 with the first of the strips 102, so that the corresponding plug socket 103 is connected to line 2 and similarly for the other columns of the card. For the present example, plug connections are made from the plug socket 103 corresponding to column 12 to the plug socket 105, from the twenty-fourth socket 103 to the socket 106 and from the thirty-eighth socket 103 to the socket 107.

Figure 11:
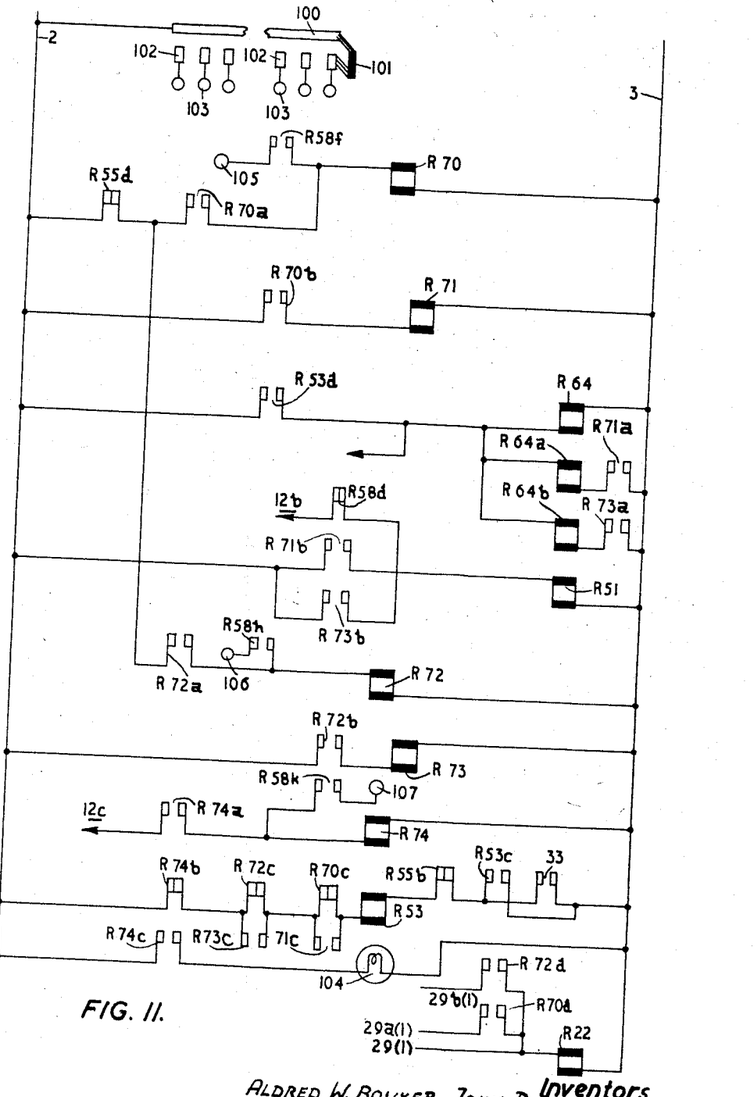
Figure 11 is a partial circuit diagram of an alternative form of control circuit.

The connections for the relay R22 representing the value 1 in the denomination $10^0$ are modified as shown in Figure 11. The wire 29 (1) from the first section of the keyboard is connected directly to the relay R22 as was the case for the full keyboard. The corresponding wire 29a (1) from the second section of the keyboard is connected through normally open contacts R70d, whilst the wire 29b (1) from the third section of the keyboard is connected through normally open contacts R72d. The other wires 29 for the denominations $10^0$, $10^1$, $10^2$ and $10^3$ are similarly connected through further contacts controlled by relays R70 and R72. In the denomination $10^4$ only the wires 29b are connected to the corresponding relays through contacts controlled by relay R72, since there is no corresponding denomination provided on the first and second sections of the keyboard. Thus, with neither relay R70 nor relay R72 energized, the setting of the key contacts 23 (Figure 4) of the first section of the keyboard is operative to control the translating relays (Figure 5A). With relay R70 energized, the first and second sections of the keyboard control the translating relays, whilst with relays R70 and R72 energized, all three sections of the keyboard are operative. However, as will be explained, the keyboard settings are cleared in succession during the punching, so that, in fact, only one value is ever entered at any particular time on to the translating relay.

Since the wires 29 are connected directly to the translating relays, as already noted, when the numbers have been set on the keyboard and the Punch key depressed, the first number will be translated and punched into the first twelve columns of the card in the manner already described in connection with the full keyboard. When column 12 is reached, there will be a circuit from line 2, common strip 100, brush 101, contact 102 for column 12, plug socket 103, plug connection (not shown), to plug socket 105. When relay R58 (Figure 5) is energized in the usual way to cause punching in, or spacing over, column 12, contacts R58f (Figure 11) close to extend the circuit from plug socket 105, contacts R58f (shifted), relay R70, to line 3. Contacts R70a close to provide a holding circuit from line 2, contacts R55d (normal), contacts R70a (shifted), relay R70 to line 3.

Contacts R70d and similar contacts in the other wires 29a close to connect the second section of the keyboard to the four lowest denominations of the translating relays R22, etc. (Figure 5A). The setting of the first section of the keyboard was cleared by energization of the key release magnet R64 when contacts R53d (Figures 5 and 11) closed during the first cycle of translation of the first number, so that none of the wires 29 is now connected to line 2 through the key contacts 23 (Figure 4). Accordingly, the number set up on the second section of the keyboard will now be registered on the left hand group of relays of Figure 5A.

During the last cycle of translation of the first number, relay R26 (Figure 5A) may be energized to represent the value 1.

When relay R58 (Figure 5) is energized, this registration would normally be transferred to relay R22, by the closing of contacts R58a, in the manner already described. To prevent this transfer, which might incorrectly add one to the registration of the second number, two normally closed contacts are inserted in series with contacts R26b (Figure 5A). One of these contacts (not shown) is operated by relay R70 and the second by relay R72. Thus during the registration of the second and third numbers, the transfer circuit between relays R26 and R22 is broken.

The circuit for energizing relay R53 (Figure 5) is modified to the form shown in Figure 11. Consequently, when relay R70 is energized, contacts R70c (shifted) prevent relay R53 being energized when contacts 33 close during the spacing from column 12 to column 13.

Contacts R70b close to energize relay R71. This relay is slower acting than the translating relays, so that sufficient time is provided for them to set up.

The circuit of relay R51 is modified as shown in Figure 11, so that circuits may be made through contacts R71b and R73b, in addition to the circuit through contacts R58d which is made when the Punch key is depressed. Accordingly, relay R51 is now energized through contacts R71b (shifted) and controls punching or spacing according to the state of relay R27, as previously described.

Contacts R71c close so that when spacing from column 13 to column 14 occurs after the energization of relay R51, a circuit is made from line 2, contacts R27b (normal), contacts R27c (normal), contacts R71c (shifted), relay R53, contacts R55b (normal), contacts 33 (shifted), to line 3. Relay R53 is energized and closes contacts R53c, making a circuit from line 2, contacts R53d (shifted) magnet R64a, contacts R71a (shifted) to line 3. This magnet is the key release magnet for the second section of the keyboard, so that this setting is now cleared from the keyboard, the number being left registered on the left hand group of the translating relays.

Relay R53 also energizes relay R54 (Figure 5) as previously described, which in turn energizes relay R55. Contacts R55d (Figure 11) open, thus de-energizing relay R70, which in turn de-energizes relay R71.

The relays R56, R57 and R58 are energized in turn, as described, to effect punching or spacing for column 14. Relay R53 is then energized again to start a new cycle of translation and punching, the circuit being made through contacts R70c which are now closed.

The punching and translating cycles occur to record the second number on the card until column 24 is reached, when a circuit is made from line 2 (Figure 11), common strip 100, brush 101, contact strip 102 for column 24, plug socket 103, plug connection (not shown), plug socket 106, contacts R58h (shifted), relay R72, to line 3. The relays R72 and R73 correspond to the relays R70 and R71, respectively, so that their energization will bring about the registration and clearance from the keyboard of the third number, in the manner described above for the second number.

Accordingly, punching of the binary equivalent of the third number will occur until column 36 has been reached. Whilst the card is at column 38, a circuit will be made from line 2 through the column selector, plug socket 107, relay R74, to line 3. Relay R74 sets up a holding circuit through contacts R74a (Figure 11) and Punch key contacts 12c (Figure 5), the relay R59 (Figure 5) not being used. Contacts R74b (Figure 5) break the circuit to relay R53, thus preventing this relay setting up and the punch carriage comes to rest at column 39, the three numbers originally set up on the keyboard having been translated and recorded on the card in the required fields. The card may then be fed out to the hopper by pressing the release key or spaced to the commencement of a new value field.

It will be appreciated that the relay R74 is similar in function to relay R59 and if desired this latter relay could be operated by suitable plugging from a column selector instead of by the skip contacts shown (Figure 5).

It is possible that, due to some mechanical failure in the punch, the card might not be fed the full number of columns. If the failure occurred at, say, column 37, the operator might not notice that the full field had not been punched, and feed the card out as correct. To guard against this possibility, the signal lamp 104 is provided. When the carriage has moved to the end of the field, relay R74 is energized, closing contacts R74c. Thus if the carriage has reached the correct position, when it stops, the lamp 104 will be lit. If, however, the carriage stops and the lamp 104 is not lit, because contacts R74c have not closed, then the operator is given warning that a failure has occurred.

We declare that what we claim is:

1. A key operated automatic punch comprising a keyboard having keys arranged for the setting up of values in decimal notation, means for halving repeatedly the decimal value set up on said keyboard, and means controlling the punching of a record at spaced intervals after each halving operation in accordance with whether the value prior to each said halving operation is odd or even, thereby recording representations of the successive digits of the binary equivalent of said decimal value.

2. A key operated automatic punch comprising a keyboard having keys arranged for the setting up of values in decimal notation, a first group of relay means for registering the decimal value set up on said keyboard, circuit means for repeatedly halving the registered value, and means for controlling the punching of a record at spaced intervals after each halving operation in accordance with whether the value before each said halving operation is odd or even, thereby recording in form of punch data representations of the successive digits of the binary equivalent of said decimal value.

3. A key operated automatic punch comprising a keyboard having keys arranged for the setting up of values in decimal notation, a first group of relay means for registering the decimal value set up on said keyboard, a second group of relay means for repeatedly halving the registered value, and means controlling the punching of a record at spaced intervals after each halving operation when the lowest digit of the value prior to each halving operation is odd, thereby recording in form of punch data representations of the successive digits of the binary equivalent of the decimal value set up on said keyboard.

4. A key operated automatic punch comprising a keyboard having keys arranged for the setting up of values in decimal notation, a first group of relay means for registering the decimal value set up on said keyboard, a second group of relay means connected in circuit with circuit means for repeatedly halving the registered value, punch means for punching a record, means for moving said record with respect to said punch means after each halving operation, and means for operating said punch means prior to each of said halving operations only if the value before halving is odd, thereby recording in form of punch data representations of the successive digits of the binary equivalent of the decimal value set up on said keyboard.

5. A key operated automatic punch comprising a keyboard having keys organized for the setting up of values in decimal notation by the depression of selected keys, means for halving repeatedly a decimal value set up on said keyboard, punch means for punching data in a record, means for moving said record with respect to said punch means through a predetermined distance as controlled by said halving means after each halving operation, means controlled by said halving means for operating said punch means prior to each halving operation only when the value at that time is odd, and manually operable initiating means for initiating the operation of said halving means and said punch means, thereby recording in form of punch data representations of the digits of the binary equivalent of the value set upon said keyboard only on operation of said initiating means.

6. A key operated automatic record punch comprising a keyboard having keys organized for the setting up of values in decimal notation by the depression of selected keys, a first group of relays, means operated by the depressed keys for registering on said first group of relays a decimal value set up on said keyboard, a second group of relays, means for alternately transferring the value from said first group to said second group and from said second group to said first group, means for halving the value at least on each transfer from one said group to the other said group, punch means for punching data in a record, means for moving said record with respect to said punch means through a predetermined distance, after each halving operation, and means controlled by said relays for operating said punch means prior to each said halving operation when the value then registered is odd, thereby recording in form of punch data representations the successive digits of the binary equivalent of said decimal value.

7. A key operated automatic recording punch comprising a plurality of depressible keys organized for the setting up of values in decimal notation by the depression of selected keys, a first group of contacts controlling relays, means operated by the depressed keys for registering on said relays a decimal value set up on said keys, a second group of relays, circuit means including contacts of the relays of said first group for selectively energizing the relays of said second group to register on said second relay group half the value registered on said first relay group, means for transferring the value registered on said second relay group to said first relay group, the said value being repeatedly halved and transferred from said first relay group to said second relay group and the halved value being transferred unaltered to said first relay group after each halving operation, punch means for punching data in a record, means for moving said record with respect to said punch means through a predetermined distance on each transfer cycle between said groups of relays, and means controlled by said groups of relays for operating said punch means when the value registered on said first group of relays is odd, thereby recording in form of punch data representations of the successive digits of the binary equivalent of said decimal value set up on said keys.

8. A key operated automatic record punch comprising a plurality of depressible keys organized for the setting up of values in decimal notation by the depression of selected keys, a first group of contacts controlling relays, means operated by the depressed keys for registering on said relays a decimal value set up on said keys, a second group of relays, circuit means including contacts of the relays of said first group for selectively energizing the relays of said second group to register on said second relay group half the value registered on said first group, means for transferring the value registered on said second relay group to said first relay group, the said value being repeatedly halved and transferred from said first relay group to said second relay group and the halved value being transferred unaltered to said first relay group upon completion of each halving operation, punch means for punching data in a record, means for moving said record with respect to said punch means through a predetermined distance after each second transfer between said groups of relays, and means controlled by at least one of the relays of said second group representing the lowest denomination for operating said punch means when the value registered on said second group of relays is odd, thereby recording in form of punch data representations of the successive digits of the binary equivalent of said decimal value set up on said keys.

9. A key operated automatic record punch according to claim 8, comprising also means operated by at least one of the relays of said first group representing the lowest denomination for operating said punch means when the value registered on said first group is odd, the said means being rendered operative only when the value registered on said first group of relays is the same as the value set up on said keys.

10. A key operated automatic record punch comprising a plurality of depressible keys organized for the setting up of values in decimal notation by the depression of selected keys, a first group of contacts controlling relays, means operated by the depressed keys for registering on said relays a decimal value set up on said keys, a second group of contacts controlling relays, circuit means including contacts of the relays of said first group for selectively energizing the relays of said second group to register on said second relay group half the value registered on said first relay group, circuit means including contacts of the relays of said second group for selectively energizing the relays of said first group to register on said first group half the value registered on said second relay group, means for cancelling the registration of either relay group upon transfer of the said value to the other relay group, the said value being repeatedly halved and transferred upon completion of each halving operation from one relay group to the other, punch means for punching data in a record, means for moving said record with respect to said punch means through a predetermined distance upon completion of each transfer from one relay group to the other, and means controlled by at least one of the relays of either said relay group representing the lowest denomination of the value registered on the said relay group for operating said punch means when the value represented on said relay group is odd, thereby recording in form of punch data representations of the successive digits of the binary equivalent of said decimal value set up on said keys.

11. A key operated automatic record punch according to claim 10, comprising also manually operable means for initiating the repeated transfer of the value from one of said relay groups to the other and the operation of said punch means.

12. A key operated automatic record punch according to claim 11, comprising also a key lock bar for retaining said depressed keys in depressed position, and electromagnetic means controlled by said manually operable means for operating the said lock bar and releasing said keys.

13. A key operated automatic record punch comprising a plurality of depressible keys organized for the setting up of values in decimal notation by the depression of selected keys, a first group of contacts controlling relays, means operated by the depressed keys for registering on said relays a decimal value set up on said keys, a second group of relays, circuit means including contacts of the relays of said first group for selectively energizing the relays of said second group to register on said second relay group half the value registered on said first relay group, circuit means for transferring the value registered on said second relay group to said first relay group, means for cancelling the registration of either said relay group upon transfer from the respective group, the said value being repeatedly halved and transferred from said first relay group to said second relay group and then transferred unchanged to said first relay group, upon completion of each halving operation, punch means for punching data in a record, means for moving said record with respect to said punch means through a predetermined distance upon completion of each transfer from said first relay group to said second relay group, means controlled by at least one of the relays of said first group representing the lowest denomination of the value registered on the said first group only when said value is the same as the value set up on said keys and by at least one of the relays of said second group representing the lowest denomination of the value registered on said second group for operating said punch means when the value registered is odd, manually operable means for initiating the repeated transfer of the value from one said group to the other and the operation of said punch means, a key lock bar retaining said depressed keys in position, and an electromagnet controlled by said manually operable means for operating said lock bar and releasing said keys.

14. A key operated automatic record punch comprising a plurality of depressible keys organized for the setting up of values in decimal notation by the depression of suitable keys, a first group of contacts controlling relays comprising four relays for each decimal denomination and representing 1, 2, 4 and 8 respectively, a similar second group of relays, means operated by the depressed keys for registering on said first group of relays a decimal value set up on said keys, circuit means including contacts of the relays of said first group for selectively energizing the relays of said second group for registering on said second group half the value registered on said first group, circuit means for transferring unchanged the value registered on said second group and the value registered on said first group upon completion of each halving operation, means for cancelling the registration of either relay group upon transfer of the said value from the respective group, punch means for punching data in a record, means for moving a record with respect to said punch means through a predetermined distance upon completion of each transfer from said first relay group to said second relay group, and means controlled by the relay representing 1 in the lowest denomination in each group for operating said punch means when the value registered on either said relay group is odd, and means rendering operative the control of said punch means by said first group of relays only when the value registered by said first group is the same as that set up on said keys.

15. A key operated automatic punch comprising a keyboard having keys organized for the setting up of values in decimal notation by the depression of selected keys, an initiating key, means for effecting repeated halving of a decimal value set up on said keyboard, punch means for punching a record, means for moving a record relative to said punch means upon completion of each halving operation, means for operating said punch means when the value after a halving operation is odd, and a chain of control relays controlling the sequence of operation, the first relay of said chain being operable by said initiating key and by said means for moving the record on each movement thereof, and the remaining relays of said chain being energized sequentially, each under the control of the relay preceding it in said chain.

16. An apparatus for recording the binary equivalent of a decimal value comprising a group of relays, means for registering on said relays a decimal value, means for repeatedly halving said decimal value registered, and means for marking a record successively and distinctively upon completion of each halving operation depending on the halved value being odd or even.

17. An apparatus for recording the binary equivalent of a decimal value comprising a group of relays, means for registering on said relays a decimal value, means for repeatedly halving said decimal value, the said halved value being registered on said group after each halving, and means controlled by said relays for marking a record distinctively upon completion of each halving operation in accordance with whether the value registered on said group of relays is odd or even.

18. An apparatus for recording the binary equivalent of a decimal value comprising a first group of relays, means for registering on said relays a selected decimal value, a second group of relays, means for registering on said second group of relays half the value registered on said first group of relays, means for transferring the halved value to said first group of relays, means for marking a record distinctively and successively, and means controlled by said groups of relays and operating said marking means for causing said record to be distinctively marked in accordance with whether the registered value after each halving operation is odd or even.

19. An apparatus for recording the binary equivalent of a decimal value comprising a first group of relays, means for setting up on said first group of relays in decimal notation a selected decimal value, a second group of relays, means for alternately transferring the value from said first group to said second group and from said second group to said first group, means for halving the value at least on each transfer from one said group to the other said group, means for punching a record, means for moving said record relative to said punch means through a predetermined distance upon completion of each halving operation, and means controlled by said relays and operating said punch means prior to each said halving operation when the value registered is odd, thereby recording on said record representations of the binary equivalent of the decimal value initially registered on said first group of relays.

20. A key operated automatic punch as claimed in claim 14, having a plurality of punches, each punch being adapted to be selected for operation by the interposition of a selector moved by an electromagnet, a plurality of electromagnets each adapted to operate a respective one of the selectors, and means for selecting one out of the plurality of electromagnets.

21. A key operated automatic punch as claimed in claim 14, having a further key for direct entry of binary values without translation, and an electromagnet adapted to operate a punch interposer, thereby rendering the said further key operative for the purpose aforesaid.

ALDRED W. BOWYER.
JOHN R. CARTWRIGHT.

References Cited in the file of this patent
UNITED STATES PATENTS

| Number | Name | Date |
| --- | --- | --- |
| 2,085,120 | Potts | June 29, 1937 |
| 2,473,444 | Rajchman | June 14, 1949 |
| 2,536,955 | Palmer | Jan. 2, 1951 |